(12) United States Patent
Smith, III

(10) Patent No.: US 6,663,144 B1
(45) Date of Patent: Dec. 16, 2003

(54) SEAL RETAINER FOR UNDERSEA HYDRAULIC COUPLING

(75) Inventor: Robert E. Smith, III, Missouri City, TX (US)

(73) Assignee: National Coupling Company, Stafford, TX (US)

(*) Notice: Subject to any disclaimer, the term of this patent is extended or adjusted under 35 U.S.C. 154(b) by 200 days.

(21) Appl. No.: 09/596,040

(22) Filed: Jun. 15, 2000

(51) Int. Cl.[7] ............................................... F16L 17/00
(52) U.S. Cl. .......................... 285/110; 285/349; 285/379
(58) Field of Search ................................ 285/110, 349, 285/379

(56) References Cited

U.S. PATENT DOCUMENTS

| | | |
|---|---|---|
| 1,583,931 A | 5/1926 | Joyce |
| 1,861,916 A | 6/1932 | Hennebohle |
| 2,429,202 A | 10/1947 | Estill et al. .................. 285/169 |
| 2,521,692 A | 9/1950 | Costello |
| 2,998,288 A | 8/1961 | Newhouse |
| 3,288,472 A | 11/1966 | Watkins |
| 3,378,269 A | 4/1968 | Castor |
| 3,519,278 A | 7/1970 | Fuhrmann et al. |
| 4,131,287 A | 12/1978 | Gunderson et al. |
| 4,169,604 A | 10/1979 | Heathcott |
| 4,302,020 A | 11/1981 | Morales |
| 4,592,558 A | 6/1986 | Hopkins |
| 4,658,847 A | 4/1987 | McCrone |
| 4,709,726 A | * 12/1987 | Fitzgibbons ............ 137/614.04 |
| 4,813,454 A | * 3/1989 | Smith ..................... 137/614.04 |
| 4,884,584 A | * 12/1989 | Smith ..................... 137/614.04 |
| 4,900,041 A | 2/1990 | Hopkins et al. |
| 5,368,070 A | 11/1994 | Bosley |
| 5,469,887 A | * 11/1995 | Smith ..................... 137/614.04 |
| 5,556,139 A | 9/1996 | Wilkins |
| 5,983,934 A | 11/1999 | Smith, III .............. 137/614.04 |
| 6,095,191 A | * 8/2000 | Smith ..................... 137/614.04 |
| 6,202,691 B1 | * 3/2001 | Smith ..................... 137/614.04 |

* cited by examiner

Primary Examiner—Robert J. Sandy
Assistant Examiner—Carlos Lugo
(74) Attorney, Agent, or Firm—Wong, Cabello, Lutsch, Rutherford & Brucculeri, L.L.P.

(57) ABSTRACT

An undersea hydraulic coupling has a male member and a female member with two ring-shaped hollow seals that engage the male member when it is inserted into the female member bore. A seal retainer restrains implosion or radial movement of one of the hollow metal seals into the female member bore, with a projection extending longitudinally into the hollow portion of the seal. The projection extends circumferentially around the end of the seal retainer adjacent its inner circumference.

8 Claims, 1 Drawing Sheet

SEAL RETAINER FOR UNDERSEA HYDRAULIC COUPLING

BACKGROUND OF THE INVENTION

1. Field of the Invention

The present invention relates to hydraulic couplings used in undersea drilling and production applications and seals used in those couplings. More particularly, the invention involves a seal retainer that restrains one or more radial seals from imploding into the bore of the female member when the coupling is disassembled.

2. Description of Related Art

Subsea hydraulic couplings are old in the art. The couplings generally consist of a male and a female member with soft seals positioned within the female member to seal the junction between the male and female members. The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion or probe at one end having a diameter approximately equal to the diameter of the large bore in the female portion of the coupling. The male member also includes a connection at its other end to facilitate connection to hydraulic lines. When the cylindrical portion of the male member is inserted into the large bore of the female member, according to the various embodiments of the device, the soft seals, resembling O-rings, either abut the end or face of the male member or engage the cylindrical probe wall about its circumference. The hydraulic fluid is then free to flow through the female and male portions of the coupling, and the seals prevent that flow from escaping about the joint and the coupling.

In some instances, a check valve may be installed in the female member and also in the male member. Each check valve opens when the coupling is made up and closes when the coupling is broken so as to prevent fluid from leaking out of the system of which the coupling is a part.

In U.S. Pat. No. 4,694,859 to Robert E. Smith, III, assigned to National Coupling Co., Inc., an undersea hydraulic coupling and metal seal is disclosed. This patent discloses a coupling with a reusable seal which engages the circumference of the probe and is positioned within the female member body. The metal seal is held in place by a cylindrical body or retainer. When the male and female portions of the coupling are parted under pressure, the retainer prevents the metal seal from blowing out through the bore of the female member. U.S. Pat. No. 4,694,859 also discloses a soft annular seal or O-ring at the inner cylindrical surface of the retainer, which engages the probe circumference. The soft annular seal generally is used as a secondary seal, and prevents escape of hydraulic fluid should the metal seal fail. As the probe begins to the enter the retainer bore, it begins to engage the soft annular seal intermediate the retainer bore. This contact compresses the seal and creates a sliding seal between it and the probe wall. The annular seal or soft seal is of relatively pliable material, for example, rubber or synthetic elastomere. The annular seal is generally ring shaped in and is located in a groove in the bore.

If the male member or probe is removed from the female member under high ambient seawater pressure, the soft annular seal oftentimes will blow out of the female member bore and be lost. The implosion of the soft seal is a characteristic problem in the prior art. As the male member or probe is pulled out of the female member bore, and the leading face of the male member reaches the midpoint of the soft annular seal, there is nothing to restrain the seal from radial movement into the bore. Very low pressure or vacuum in the bore may result in the seal being imploded into the bore, as the ambient seawater begins to enter the bore at high pressure. If the soft annular seal blows out through the female bore, it may be extremely difficult to replace the seal within the bore. There are also difficulties encountered in machining a groove in the female bore for the seal and inserting the seal in that groove.

Several undersea hydraulic couplings have been designed to restrain the seal from radial movement into the bore. For example, U.S. Pat. Nos. 4,900,071 and 5,052,439 to Robert E. Smith, III, assigned to National Coupling Co., Inc., disclose undersea hydraulic couplings with dovetail seals. The dovetail seals are restrained from radial movement by a dovetail interfit with a mating shoulder on the retainer sleeve and/or the retainer locking member. The inner cylindrical surface of the dovetail seal engages the circumference of the male member or probe as the probe is inserted through the retainer into the female member. The coupling also may have a reusable metal seal that is held on a shoulder in the female bore by the retainer. The metal seal is pressure energized so that hydraulic fluid pressure acting on the seal tends to urge the seal radially inwardly against the probe and radially outwardly against the female member body.

The dovetail seals in U.S. Pat. Nos. 4,900,071 and 5,052,439 are not pressure energized. In some applications, it is desirable to use a pressure energized seal as the secondary seal, instead of the dovetail seal. This is desirable because at greater ocean depths, the need to prevent leakage of hydraulic fluid from the coupling is critical. Additionally, due to increased subsea pressures at greater ocean depths, there also is a critical need to prevent implosion of seals into the coupling bore when the male member and female member are separated.

SUMMARY OF THE INVENTION

The present invention overcomes the above mentioned problems and disadvantages by providing an undersea hydraulic coupling having a seal retainer that holds a pair of pressure energized seals in the female member bore, and restrains at least one of the seals from radial movement or implosion into the bore when the coupling members are separated. The retainer holds a first pressure energized radial seal on a shoulder in the female member bore and, additionally, has a projection extending longitudinally therefrom to hold a second pressure energized radial seal and restrain the second seal from radial movement into the female member bore. The second seal preferably is an elastomeric seal. The projection extending from the seal retainer extends into the hollow portion of the second seal.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF A PREFERRED EMBODIMENT

Figures 1, 1A:
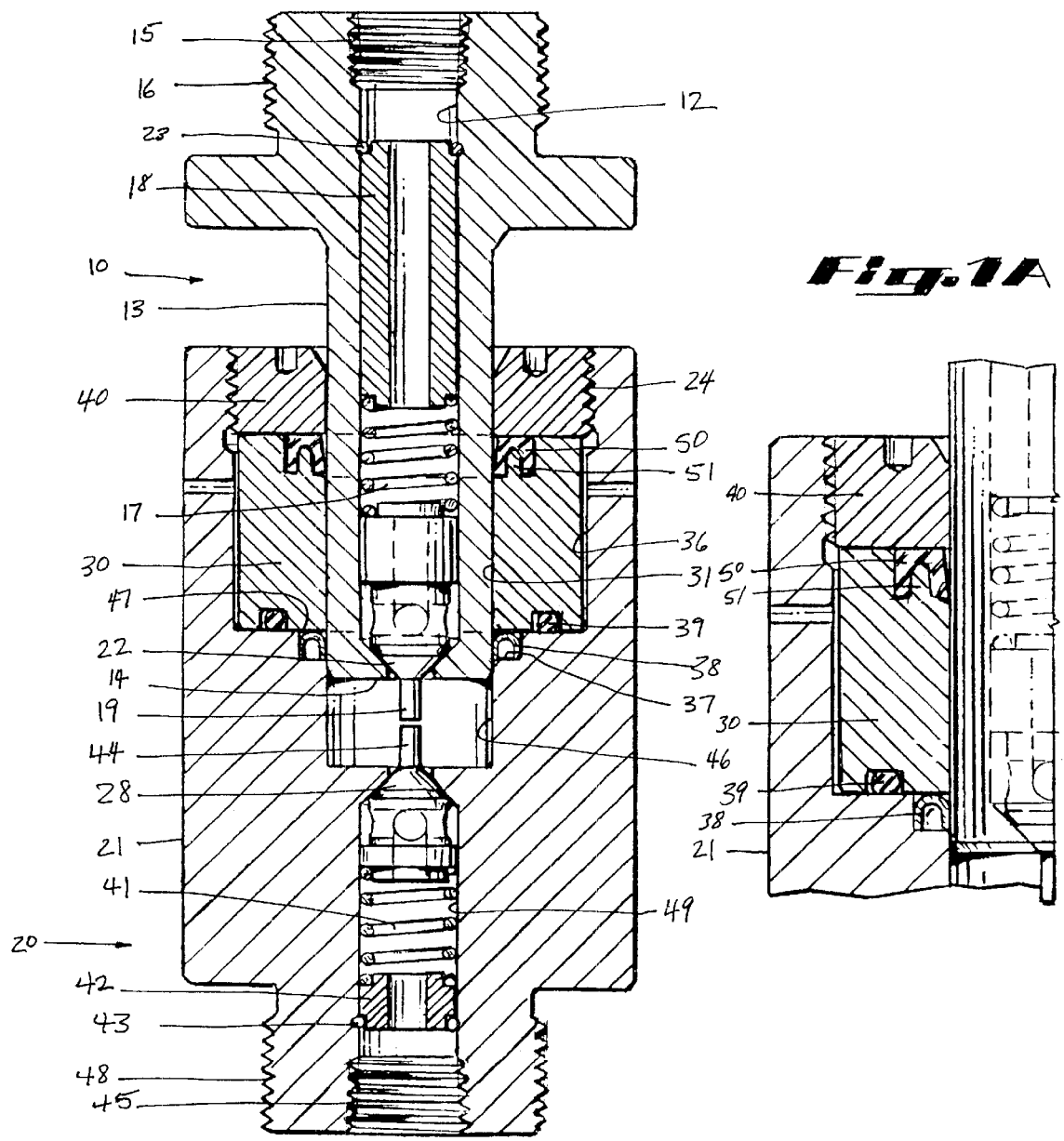
FIG. 1 is a section view of the male and female coupling members, with the male member partially inserted into the female member receiving chamber.
FIG. 1A is an expanded section view of the seal retainer and pressure energized seals, according to a preferred embodiment of the present invention.

FIG. 1 is a section view of a first embodiment showing male member 10 and female member 20 as the male member is partially withdrawn from the female member bore. Male member 10 includes handle 16 which preferably is threaded for attachment to a manifold plate. Female member 20 may be attached to a second manifold plate by threads or other means. Techniques for attaching he members to such plates are well known to those skilled in the art.

Male member 10 comprises probe section 13 which preferably is cylindrical and terminates at leading face 14. The male member probe wall is dimensioned for sliding engagement with female member 20 and the seal retainers as will be discussed in more detail below.

The body of the male member also is provided with central bore 12. The bore may have several variations in its diameter as it extends through the body of the male member. In a preferred embodiment, the first end of the central bore comprises internally threaded section 15 for connection to a hydraulic line. Adjacent and inboard of the threaded section is a cylindrical passageway extending longitudinally within the male member body and terminating at a valve seat adjacent leading face 14 of the male member.

A poppet valve assembly of the male member is slidably received within central bore 12. Cylindrical hollow valve head 22 has an outer diameter dimensioned to slide within the cylindrical bore. The valve head is conical in shape and dimensioned to seat on the valve seat at the end of the male member bore. The valve has stem 19 or actuator extending therefrom. Helical valve spring 17 urges valve 22 into a closed position against the valve seat. Helical valve spring 17 is located within cylindrical bore 12 and is anchored with spring collar 18 which is held in place by a collar clip 23.

Female member 20 includes handle 48 which is preferably threaded to a manifold plate. The female member also includes cylindrical body 21 having a central bore extending therethrough. The central bore preferably has several variations in its diameter as it extends longitudinally or axially through the body of the female member. At a first or outer end of the central bore is threaded internal passageway 45 for connection to a threaded hydraulic line. The threaded portion 45 of the central bore terminates at cylindrical passageway 49 which slidably receives a poppet valve assembly. Inboard of the valve seat is a stepped receiving chamber having a first diameter 46 and a second, larger diameter 36. Between the first and second diameters of the receiving chamber are internal shoulders 37 and 47. The section of the receiving chamber having the smaller diameter 46 is dimensioned to slidably receive probe section 13 of the male member of the coupling.

The valve assembly of the female member comprises poppet valve 28 which is slidably received within cylindrical passageway 49. The poppet valve has a generally conical shape for seating at valve seat in the female member bore and a cylindrical body for sliding within bore 49. Stem 44 or actuator extends from the apex of the conical valve face. To urge the valve into the closed position, helical valve spring 41 is mounted between the shoulder of the valve and spring collar 42 having collar clip 43 engaged to the female member bore. The valves of the female member and the male member are preferably similar in components and function.

The female member bore has shoulder 37 which is dimensioned to provide a surface for positioning ring shaped radial hollow metal seal 38 thereon. The hollow radial metal seal is preferably expansible and responds to fluid pressure acting in its internal cavity or hollow central section to urge the inner circumference of the seal radially inwardly against the probe of the male member. The first, radial metal seal is held in the female member by seal retainer 30 which is a sleeve shaped member that is dimensioned to slide in the larger section 36 of the female member bore. Seal retainer 30 has internal diameter 31 which is dimensioned to receive probe section 13 therethrough. When the seal retainer is inserted into the female member bore, or otherwise engaged to the female member body, the first end of the seal retainer may abut, or be adjacent to, hollow ring shaped seal 38. Additionally, O-ring seal 39 may be included in a groove around the first end of the sleeve shaped seal retainer.

The second end of the seal retainer has a projection 51 extending therefrom which is a seal retaining element extending circumferentially around the seal retainer adjacent the retainer's inner circumference 31. A second, hollow ring shaped seal 50 is positioned on the projection or seal retaining element and is held in place thereby. Seal 50 has an inner circumference, a hollow central portion, and an outer circumference. The inner circumference of seal 50 engages the cylindrical probe section 13 of the male member. The outer circumference of seal 50 engages and seals with the sleeve shaped seal retainer 30. The hollow central portion of seal 50 is configured to fit over projection 51 or seal retaining element.

Seal 50 is pressure energized by fluid from the coupling members acting on its hollow central portion to pressure energize the seal and urge its inner circumference against the male member or probe. Preferably, seal 50 is an elastomeric seal that seals against leakage of hydraulic fluid from the coupling but will allow seawater to bleed into the receiving chamber.

Retaining locking member 40 is threaded at 24 to the female member and holds seal retainer 30 in place. Additionally, retainer locking member 40 may be used to help hold seal 50 over projection 51 of the seal retainer. Thus, the seal retainer 30 has an interfit with the hollow pressure energized seal 50 to prevent that seal from imploding into the bore of the female member when the male member is withdrawn and the coupling members are separated. Preferably, the poppet valves in the male member and female member are closed before the seal between the male and female members is broken or disengaged.

As shown in FIG. 1A, seal retainer 30 holds first hollow radial seal 38 against shoulder surface 37, and restrains the second hollow pressure energized seal over projection 51 extending from the second end of the seal retainer adjacent its inner circumference. Accordingly, the present invention provides a seal retainer that retains two pressure energized seals, and restrains at least one of the seals form radial movements into the bore, or implosion, when the coupling members are separated.

Although in the embodiment of FIG. 1 and FIG. 1A, both seals engage the same diameter of the probe, the probe also may have a stepped diameter and each of the seals may engage a different diameter. Additionally, retainer locking member 40 may include a projection or cavity having an interfit with seal 50 to further restrain the seal from implosion into the bore of the female member.

Projection 51 at the second end of the seal retainer may extend circumferentially around the seal retainer adjacent its inner circumference, or, if desired, may extend partially or intermittently around its inner circumference. Pressure energized seal 50 may have a tight interfit with projection 51 or, if desired, there may be significant clearance between the hollow central portion of the seal and the projection. If desired, the pressure energized seal may have an interference fit, or be pre-loaded to engage the probe section 13 of the male member.

It will be now understood by those of skill in the art that an improved undersea hydraulic coupling may be made utilizing the present invention. Although variations in the embodiment of the present invention may not each realize all of the advantages of the invention, certain features may become more important than others in various applications of the device. The invention, accordingly, should be understood to be limited only by the scope of the appended claims.

What is claimed is:

1. A sealing apparatus for an undersea hydraulic coupling member comprising:
   a sleeve-shaped seal retainer retaining a first hollow pressure-energized seal and a second hollow pressure-energized seal in an undersea hydraulic coupling member;
   the retainer having a first end abutting the first hollow pressure-energized seal, the first hollow pressure-energized seal having a sealing interfit between the undersea hydraulic coupling member and the first end of the retainer;
   the retainer having a second end with an annular projection extending therefrom, the second hollow pressure-energized seal having a tight interfit with the annular projection and having an outer circumference that sealingly engages the retainer; and
   a retainer locking member engaging the undersea hydraulic coupling member and having an interfit with the second hollow pressure-energized seal to seal against leakage of hydraulic fluid between the retainer and retainer locking member.

2. The sealing apparatus of claim 1 wherein the retainer locking member is threaded to the undersea hydraulic coupling member.

3. The sealing apparatus of claim 1 wherein the first hollow pressure-energized seal is a metal seal.

4. The sealing apparatus of claim 1 wherein the second hollow pressure-energized seal is an elastomeric seal.

5. An undersea hydraulic coupling member comprising:
   a coupling body having a bore and an internal shoulder in the bore;
   a first hollow pressure-energized seal positioned on the internal shoulder;
   a seal retainer having a first end abutting the first hollow pressure-energized seal and retaining the first seal in sealing engagement with the internal shoulder and with the seal retainer;
   an annular projection extending from the second end of the seal retainer;
   a second hollow pressure-energized seal having a tight interfit with the annular projection and having an outer circumference in sealing engagement with the seal retainer; and
   a retainer locking member engaging the coupling body and having an interfit with the second hollow pressure-energized seal to seal against leakage of hydraulic fluid between the seal retainer and retainer locking member.

6. The undersea hydraulic coupling member of claim 5 wherein the retainer locking member is threaded to the coupling body.

7. The undersea hydraulic coupling member of claim 5 wherein the first hollow pressure-energized seal is a metal seal.

8. The undersea hydraulic coupling member of claim 5 wherein the first hollow pressure-energized seal is an elastomeric seal.

* * * * *